March 3, 1964

O. BRUMMER ETAL 3,123,367

WEDGE SHAPED OIL SEAL MEANS FOR SHAFTS

Filed Dec. 4, 1959

Inventors:
Olin Brummer
and John Talamonti
By Jones, Darbo + Robertson
Attys.

United States Patent Office 3,123,367
Patented Mar. 3, 1964

3,123,367
WEDGE SHAPED OIL SEAL MEANS FOR SHAFTS
Olin Brummer and John Talamonti, Chicago Heights, Ill., assignors, by direct and mesne assignments, to Borg-Warner Corporation, Chicago, Ill., a corporation of Illinois
Filed Dec. 4, 1959, Ser. No. 857,323
6 Claims. (Cl. 277—171)

This invention relates to oil seal means for shafts and aims to provide improved expedients for this purpose and more particularly for the rear main bearing of an automobile engine where the engine shaft projects from the motor housing. The invention provides an annular seal at this point, preferably formed of two mating half circle sections permitting installation of the seal by the bringing of the half circle sections together with the sections of the motor housing.

The present invention contemplates improved means for locating the seal sections with respect to the motor housing and improved sealing effects at said location.

The invention further contemplates improved metallic reinforcement means for the elastomer body of the seal and an improved relationship between the metallic reinforcement means and the sealing lip of the seal.

The foregoing and other objects and advantages will be apparent from the following description, taken together with the accompanying drawings, showing an illustrative embodiment of the invention, and in which drawings—

Figure 1:
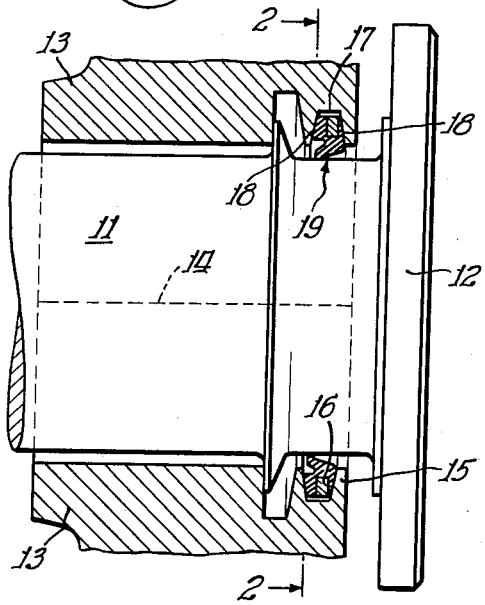
FIGURE 1 shows an illustrative partial view of the engine shaft and the motor housing in the region of the location of the sealing means, and being a fragmentary axial section at this point.

Referring in detail to the illustrative construction shown in the drawings, numeral 11 indicates an engine shaft the rear end of which is provided with a flywheel enlargement 12. 13 are two motor housing sections which may be split to be brought together on an axial mating line 14 to close on the shaft where the flywheel enlargement projects from the housing.

Adjacent the flywheel enlargement 12 the motor housing takes the form of an annular inwardly directed flange 15, approaching the shaft 11, to accommodate the sealing means next described.

In accordance with the present invention, the sealing means includes an annular wedge-shaped groove 16 in the flange 15 facing radially thereof toward the shaft 11, this groove having an axially straight bottom 17 and radially outwardly tapering walls 18. The wedge-shaped groove 16 receives the seal element itself 19.

The seal element 19 which when installed makes a complete annulus contacting the shaft 11 is preferably basically in the form of two arcuate half-circle sections, each numbered 20, since they may be molded identically of elastomer material such as synthetic rubber resistant to the action of heat, cold, lubricants and the like. Since the half-circle sections 20 are advantageously identical, the description of one of them will next be given.

Each half circle portion 20 comprises an elastomer body of arcuate form having a first portion 21 in which is embedded during molding a substantially rigid metal half-ring 22. The metal half-ring 22 is desirably of greater dimension radially than axially and extends throughout the peripheral and radial length of the portion 21 of the elastomer body, thereby defining this portion of the body. Each metal half-ring is desirably a full half circle, i.e., 180 degrees.

Extending radially from the body portion 21 of, and, in this instance, inwardly thereof, is a second elastomer body portion 23 integral with the portion 21 and somewhat obliquely directed to provide the arcuate sealing lip 24 that terminates as here shown in an axially straight face 25 for a bearing on the shaft 11. Importantly, in accordance with the present invention the sealing lip 24 terminates in a radial plane offset from the radial plane of the metal insert 22, and in this instance, inwardly of the shaft 11.

An axially facing face 26 of the body 20 is tapered to conform to a tapered wall 18 of the groove 16. The other axially facing face 27 of the body also advantageously has an overall taper corresponding to the other groove wall 18, but, in this instance, embodied in a plurality of annular corrugations 28, 29 and 30 of progressively larger gradations, thus providing arcuate elastomer ribs that engage the adjacent groove wall 18.

When the arcuate body 20 is forced into the motor housing flange groove 16 under pressure, walls 26 and 27 of the body, by a wedging action, tightly engage the walls 18 of the groove and make a secure sealing fit therewith, the metal ring 22 providing controlled resilience and stability of the body portion 21 in this wedging action.

At the same time, the oblique sealing lip 24 of the body portion 23 while supported and oriented by the metal reinforced body portion 21, is free to adapt itself to the surface of the shaft 11 and make a snug running sealing fit therewith, on its surface 25, that inhibits emergence of oil lubricant past the seal 19. If enhanced oil pressure occurs, the arcuate recess 31 between the oblique sealing lip 24 and the body portion 21 employs such oil pressure to impinge on the back face of the sealing lip thereby tending to further press the sealing lip against the shaft.

Figure 2:
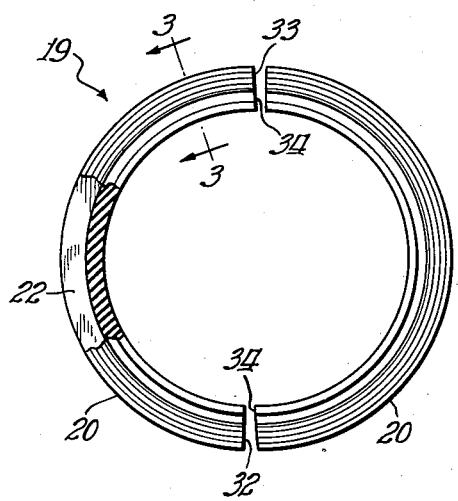
FIGURE 2 is a face view of the two half circle sections of the seal making up the complete annulus, looking at the left-hand face of the seal as on the line 2—2 of FIG. 1, and broken away in part for purposes of description.

One end of each of the arcuate bodies 20 is shown radially straight as at 32 while the other end 33 is desirably molded on a slight angle from a radius, the taper being such as to bring the ends of the sealing lips of the half sections closer together, so that when two mating half-circle sections are pressed together, as in installation as shown in FIG. 1 the sealing lip portions 23 of the half-circle sections are peripherally pressed together by additional pressure circumferentially to prevent the passage of oil between the half-circle sections. The elastomer body of each half-section defines an arc slightly more than a half-circle while the metal insert sections are only 180 degrees. The yielding capacity of the elastomer permits the latter to flow somewhat at 34, at diametrically opposite points, as best seen in FIG. 2, to enhance the seal while permitting the metal inserts 22 to come into close adjacency but without interference with the enhanced elastomer sealing effect at 34.

Figure 3:
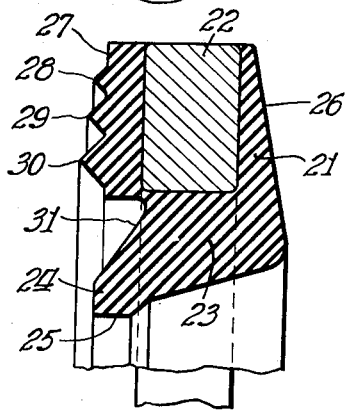
FIGURE 3 is a cross-section taken on the line 3—3 of FIG. 2, enlarged.

As best seen in FIGS. 1 and 3 the metal insert 22 has a relatively large rectangular end face which, when the two mating half sections are brought together upon the closing of the housing or motor block sections 13 on the shaft 11, guards against these half sections slipping past each other at their ends or being peripherally displaced as pressure is brought to bear upon them as at the meeting faces 34, thus assuring that these meeting faces 34 are in tight and rectilinear abutment to prevent seepage of lubricant at these points.

Furthermore, when the motor block housing is closed on the shaft and as the seal device 19 is pressed into the housing groove 16, both being wedge shaped in cross-section, gradually increasing resistance is offered to movement of the seal device into the housing groove, thus insuring a tight fit of the seal device in the groove and providing compensation for variations or tolerances in dimensions of the parts at these points. This compensatory adjustment may and desirably does occur in normal installations without the seal device reaching the bottom 17 of the groove 16.

Moreover, in the wedging action of the seal device in the groove, the compensatory function just described takes place principally between the face 27 of the seal device and the face 18 of the groove immediately adjacent thereto, the peaked corrugations 28, 29 and 30, with their enhanced flexibility, accommodating and facilitating the compensatory action. The opposite face 26 of the seal device which engages the other wall 18 of the groove is desirably of solid construction having some but more limited flexibility, or flow capacity, especially as reinforced by the solid ring insert 22 which is advantageously closer to the face 26 than to the face 27. This advantageous location of the ring insert thus serves the two-fold purpose of stiffening the face 26 while at the same time permitting enhanced flexibility of the face 27 and of the sealing lip 24.

Offsetting of the sealing lip 24 from the radial plane of the metal insert 22 is believed to promote the desirable result of the stabilizing of the elastomer body portion 23 by the insert while permitting free radial play of the sealing lip itself 24 by a lever or hinge action without interference by the insert.

Figure 4:
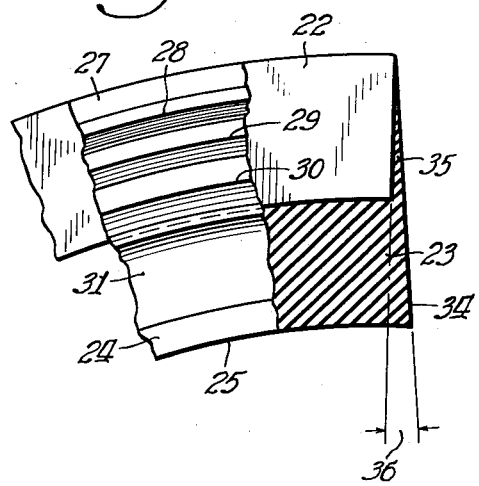
FIGURE 4 is a face view of parts shown in FIG. 3 broken away for purposes of description.

As best seen in FIG. 4, the end 34 of a half section 20 is on a taper that provides a thin coating of elastomer over the end 35 of the metal insert 22, the angle 36 being of the order of 5 degrees say.

The invention having been described, it will be understood that such changes may be made as fall within the scope of the appended claims without departing therefrom.

What is here claimed is:

1. In oil seal means for shafts comprising two semi-circular bodies mainly of elastomer material each having a first outwardly peripheral portion wedge shape in cross section and a second radially inward portion, the first portion carrying embedded therein a rigid half-ring of greater dimension radially than axially, said rigid half-ring being of a dimension such that when said semi-circular bodies are placed in end-to-end relationship said rigid half-ring provides controlled resilience and stability to said body and is suitable to force said wedge shaped peripheral portion into and against a corresponding wedge shaped groove in the housing supporting said oil seal means, said second portion having a juncture with the first portion offset from the center of the half-ring and having an obliquely extending sealing lip terminating in a plane spaced axially from the plane of the rigid half-ring in one axial direction, the elastomer material being continuous and of substantial thickness through the juncture on the side in the opposite axial direction whereby said sealing lip is accurately and firmly positioned at the juncture and may ply radially in a radial plane offset axially from said half-ring.

2. The structure of claim 1 wherein an axially facing face of the first portion is corrugated.

3. The structure of claim 1 wherein one of the axially facing faces of said first portion is closer to the rigid half-ring than the other and is smooth, and the other is corrugated.

4. The structure of claim 1 wherein the sealing lip has an axially flattened termination.

5. In oil seal means for shafts, the combination with a motor housing portion receiving a rotating shaft and having an outwardly tapering annular groove adjacent a portion of the shaft, an annular seal in said groove, including two mating semicircular elements each mainly of molded elastomer material and having a first and radially outer portion wedge shape in cross section received in said groove and a second and radially inner portion providing an obliquely directed sealing lip projecting from the groove to engage the shaft, a rigid half-ring of greater dimension radially than axially, in said first portion and radially aligned with the juncture of said first portion and said second portion, said rigid half-ring being of a dimension such that when said semi-circular bodies are placed in end-to-end relationship said rigid half-ring provides controlled resilience and stability to said body and is suitable to force said wedge shaped peripheral portion into and against a corresponding wedge shaped groove in the housing supporting said oil seal means whereby said sealing lip is accurately and firmly positioned at the juncture and may ply radially in a radial plane offset axially from said juncture.

6. Oil seal means as defined in claim 5 in which one face of the outer wedge shape portion is corrugated.

References Cited in the file of this patent

UNITED STATES PATENTS

| | | |
|---|---|---|
| 1,330,381 | Marsh | Feb. 10, 1920 |
| 2,329,028 | Austin | Sept. 7, 1943 |
| 2,558,183 | Kosatka | June 26, 1951 |
| 2,697,623 | Mosher | Dec. 21, 1954 |
| 2,719,743 | Brummer et al. | Oct. 4, 1955 |
| 2,729,481 | Chambers et al. | Jan. 3, 1956 |
| 2,887,331 | Johnson | May 19, 1959 |
| 3,027,167 | Liebig | Mar. 27, 1962 |

FOREIGN PATENTS

| | | |
|---|---|---|
| 834,627 | Germany | Mar. 20, 1952 |